United States Patent [19]

Yoshimura et al.

[11] Patent Number: 5,158,802
[45] Date of Patent: Oct. 27, 1992

[54] PROCESS FOR PRODUCING A MAGNETIC RECORDING MATERIAL

[75] Inventors: Makoto Yoshimura; Keiji Tanaka; Shinichi Funabashi, all of Kanagawa, Japan

[73] Assignee: Fuji Photo Film Co., Ltd., Kanagawa, Japan

[21] Appl. No.: 811,904

[22] Filed: Dec. 23, 1991

Related U.S. Application Data

[63] Continuation of Ser. No. 627,907, Dec. 17, 1990, which is a continuation of Ser. No. 424,631, Oct. 20, 1989, abandoned.

[30] Foreign Application Priority Data

Oct. 20, 1988 [JP]  Japan ................................ 262905/88

[51] Int. Cl.$^5$ .............................................. B05D 5/12
[52] U.S. Cl. .................................... 427/130; 427/128; 428/695; 428/900
[58] Field of Search ................. 427/128, 130; 428/695, 428/900

[56] References Cited

U.S. PATENT DOCUMENTS 4,391,851  7/1983  Yamada et al. ...................... 427/130
4,711,819  12/1987  Hanai et al. ........................ 427/130 X Primary Examiner—Bernard Pianalto
Attorney, Agent, or Firm—Sughrue, Mion, Zinn, Macpeak & Seas

[57] ABSTRACT

A process for producing a magnetic recording medium is described in which a hardening agent and a lubricant are added to a magnetic coating solution prior to coating thereof on a non-magnetic support. It has been found that improved magnetic recording properties and consistent product characteristics are obtained if the addition of the hardening agent and lubricant to the magnetic coating solution is carried out within about 240 minutes of surface calendering treatment of the magnetic recording medium.

9 Claims, 1 Drawing Sheet

FIGURE
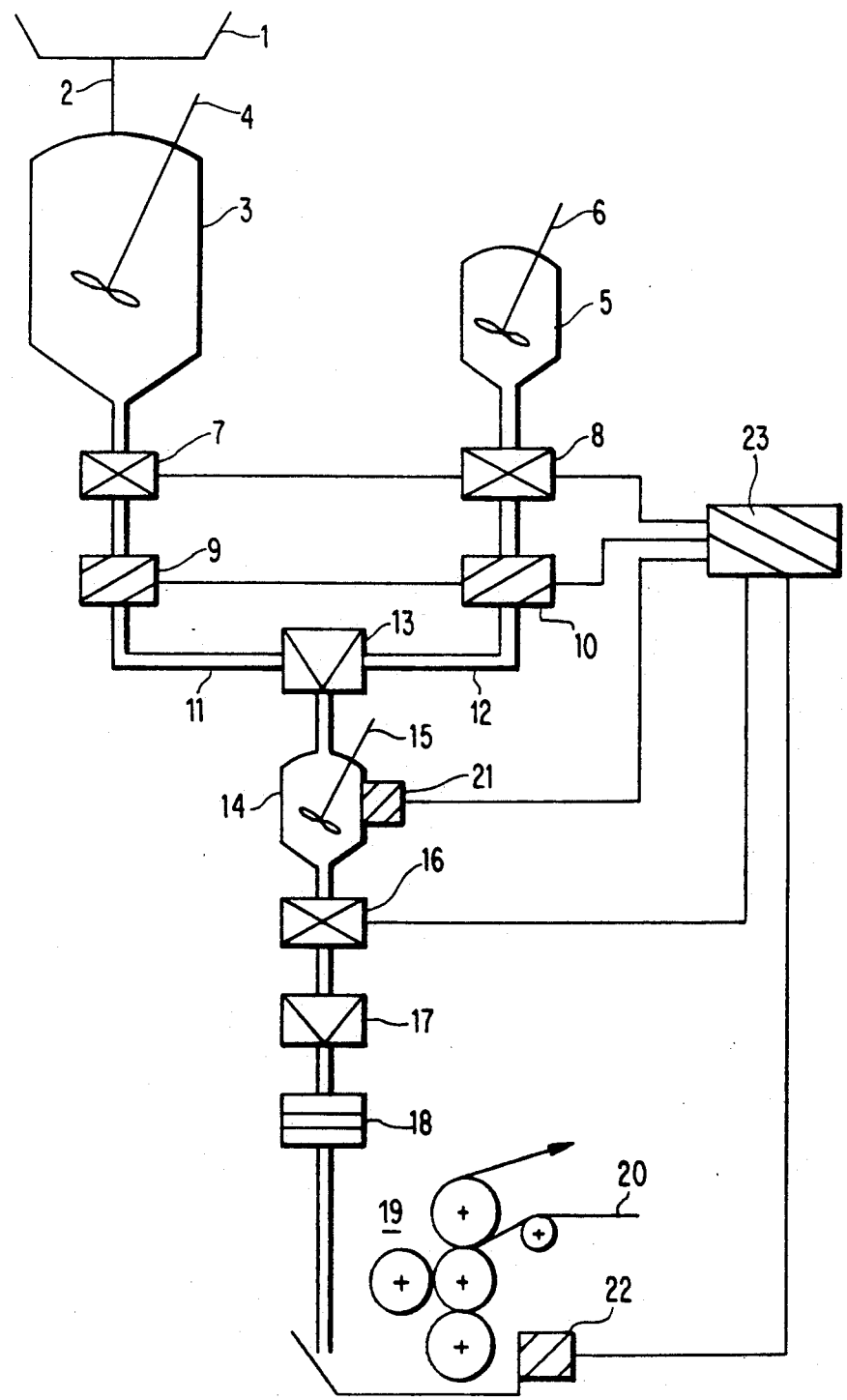

PROCESS FOR PRODUCING A MAGNETIC RECORDING MATERIAL

This is a continuation of application Ser. No. 07/627,907 filed Dec. 17, 1990, abandoned, in turn is a continuation of Ser. No. 07/424,631 filed Oct. 20, 1989, abandoned.

FIELD OF THE INVENTION

This invention relates to a process for producing a magnetic recording medium, and in particular it relates to a process for providing a magnetic recording medium having excellent magnetic layer surface properties.

BACKGROUND OF THE INVENTION

In general, a magnetic recording medium is produced by applying a magnetic coating solution containing a ferromagnetic powder and a binder on a non-magnetic support (hereinafter, occasionally referred simply to as "support") to form a magnetic layer, conducting orientation etc., drying the magnetic layer, and then conducting a calendering treatment so as to improve the surface smoothness, etc., of the magnetic layer.

A magnetic coating solution is usually prepared by kneading a binder, a dispersing agent, a lubricant, etc., using an organic solvent. In recent years, with the trend toward high-density magnetic recording, magnetic recording media of this kind also are required to have highly improved durability, and for this reason, the binder compositions used have changed from conventional non-hardenable types to hardenable types.

In the case where a hardenable binder is used, a magnetic coating solution has been prepared by a method in which at least one of the ingredients for the hardenable binder or a hardening catalyst is kneaded into the coating solution at the final stage of the production process, in order to prevent a hardening reaction during the production of the magnetic coating solution. The magnetic coating solution obtained after the dispersing step should be applied on a flexible support as soon as possible because a hardenable ingredient or a catalyst has already been added to the solution. Since the hardening reaction of the binder can proceed in a magnetic coating solution allowed to stand for a long period of time, magnetic recording media obtained by coating such a coating solution are not satisfactory in properties that high-density recording media are required to have, i.e., squareness ratio, surface properties, durability, etc. In conducting surface treatments such as, particularly, a calendering treatment, whether or not the treatments provide good effects depends on the degree of the progress of the hardening reaction of the magnetic layer. In connection with such a problem, JP-B-58-10073 (The term "JP-B" as used herein means an "examined Japanese patent publication") discloses a method in which a magnetic coating solution is applied on a support while continuously adding a hardening agent to the magnetic coating solution, thereby to eliminate a disadvantage where a hardenable binder is used.

As described above, previously the formulation or preparation of conventional magnetic coating solutions has been done by paying attention only to the reaction of the hardening agents. To take an extreme example, alcoholic - OH groups, water, etc., reactive to hardening agents have also been controlled during the production steps. However, as a result of recent studies and development by the present inventors, it has been found that consideration should be given not only to the hardening agents but also to the preparation of other ingredients and to the calendering treatment used for smoothing the surfaces of magnetic layers, for the purpose of improving the quality (Y·S/N, adhesion, value during running), etc., of coating films of magnetic recording media and also for attaining uniform and stable production. For example, JP-A-60-147931 (The term "JP-A" as used herein means an "unexamined published Japanese patent application") addressed problems where a ferromagnetic powder, for example, ferromagnetic metal powder, having a large magnetic moment and which is advantageous for high density should be dispersed for a long period of time because of its poor dispersibility into a binder. Hence, such a process is industrially disadvantageous, and even if the powder can be dispersed, this dispersion (magnetic coating solution) will results in agglomerates if it is left standing for a long period of time.

In order to overcome such problems, a method has been proposed in which ingredients not including a lubricant are treated at the time of kneading to prepare a magnetic coating solution and, just before the above-described magnetic coating solution is applied on a non-magnetic support, a lubricant is added and mixed, as composed with conventional methods where a ferromagnetic powder, a binder, a lubricant, an abrasive agent, etc., are kneaded all together to prepare a magnetic coating solution. Specifically, JP-A-60-147931 gives an example in its Examples that a hardening agent (triisocyanate) and a lubricant (fatty acid) are post-added, and squareness ratios and surface gloss have been greatly improved by this method. Conventionally, however, coating and calendering treatment have not been conducted successively in such a process, but a method has been employed in which coating is conducted, followed by heat drying and rolling up the medium, and thereafter a calendering treatment is conducted with heating again. However, this method cannot sufficiently satisfy desired properties such as brilliance signal (Y·S/N) and surface properties, which are now required for high-density recording.

SUMMARY OF THE INVENTION

Accordingly, an object of this invention is to provide a production process which can consistently supply magnetic recording media showing high sensitivity and low noise, and having excellent running properties, even with close contact with magnetic heads.

The process for producing a magnetic recording medium according to the present invention comprises coating on a non-magnetic support a magnetic coating solution prepared by kneading a ferromagnetic powder and a binder solution to disperse the powder into the solution, thereby to form a magnetic layer, and then subjecting the coated support to a calendering treatment, wherein after the ferromagnetic powder is dispersed into the binder solution by kneading to prepare a magnetic coating solution, a hardening agent and a lubricant are added to the said magnetic coating solution, and within about 240 minutes after the addition, the coating is conducted to form a magnetic layer and the calendering treatment is then conducted.

That is, according to this invention, high sensitivity, low noise and also improved surface properties have been attained by conducting a calendering treatment while maintaining the effect of the post-addition of the hardening agent and lubricant as much as possible. It has been found that although dispersibility is improved by the post-addition of a hardening agent and a lubricant as described in JP-A-60-147931, the hardness of a binder is increased and further the lubricant, which has been uniformly dispersed, becomes non-uniform, due to the process which comprises coating, heat-drying, rolling up, and then cooling. Once the lubricant has become non-uniform, it cannot be made uniform as in the original state even if it is heated with a subsequent calendering treatment. In view of the above, as a result of intensive studies, it has been found in the present invention that excellent calendering properties and surface properties can be obtained by a method in which a hardening agent and a lubricant are post-added and dispersed uniformly, and coating and calendering treatment are conducted within 240 minutes after the post-addition, thereby conducting calendering while maintaining the uniformly dispersed state.

BRIEF DESCRIPTION OF THE DRAWING

The FIGURE is a schematic view showing one embodiment of a process for the production of magnetic recording media according to the process of this invention.

DETAILED DESCRIPTION OF THE INVENTION

The process of this invention will be explained below in detail.

First, the magnetic coating solution (hereinafter occasionally referred to as "magnetic coating composition") used in this invention is explained below.

The ferromagnetic powder which can be used in the magnetic coating solution of this invention is a conventional ferromagnetic powder such as $\gamma$-$Fe_2O_3$, Co-containing $\gamma$-$Fe_2O_3$, $Fe_3O_4$, Co-containing $Fe_3O_4$, $CrO_2$, a Co-Ni-P alloy, a Co-Ni-Fe alloy, a Co-Ni-Fe-B alloy, an Fe-Ni-Zn alloy, an Fe-Mn-Zn alloy, an Fe-Co-Ni-Cr alloy, an Fe-Co-Ni-P alloy and an Ni-Co alloy.

These ferromagnetic powders have a particle size of about 0.2 to 2 $\mu$m in length and a length/width ratio of about 1/1 to 20/1.

The binder which can be used in the magnetic coating composition of this invention is a conventionally known thermoplastic resin, thermosetting resin, reactive resin or a mixture thereof.

The thermoplastic resin which can be used is a resin having a softening temperature of 150° C. or less, an average molecular weight of 10,000 to 200,000 and a degree of polymerization of about 200 to 500, and the examples thereof include a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (such as cellulose acetate butyrate, cellulose diacetate, cellulose triacetate, cellulose propionate, nitrocellulose), a styrene-butadiene copolymer, a polyester resin, a chlorovinyl ether acrylic ester copolymer, an amino resin, thermoplastic resins of various synthetic rubber types, and mixtures thereof.

The thermosetting resin or reactive resin is a resin having a molecular weight of 200,000 or less in the state of a coating solution and which is increased toward infinity through a reaction such as condensation, addition, etc., by heating after coating and drying. Of such resins, preferred are resins which do not soften or melt until the resins undergo thermal decomposition. Specifically, the examples thereof include a phenolic resin, an epoxy resin, a thermosetting polyurethane resin, a urea resin, a melamine resin, an alkyd resin, a silicone resin, a reactive acrylic resin, an epoxy-polyamide resin, a nitrocellulose-melamine resin, a mixture of a high molecular weight polyester resin and an isocyanate prepolymer, a mixture of a methacrylate copolymer and a diisocyanate prepolymer, a mixture of a polyester polyol and a polyisocyanate, a urea-formaldehyde resin, a mixture of a low molecular weight glycol, a high molecular weight diol and triphenylmethane triisocyanate, a polyamine resin and mixtures thereof.

These binders can be used alone or in combination, and other additives may be further added.

The amount of the binder to be mixed with the ferromagnetic powder is in the range of from 10 to 200 parts by weight per 100 parts by weight of the ferromagnetic powder.

Various additives for the coating solution include a dispersing agent, a lubricant, an abrasive agent, etc.

Examples of the dispersing agent are a fatty acid having 12 to 18 carbon atoms ($R_1COOH$, wherein $R_1$ is an alkyl group having 11 to 17 carbon atoms) such as caprylic acid, capric acid, lauric acid, myristic acid, palmitic acid, stearic acid, oleic acid, elaidic acid, linoleic acid, linolenic acid or stearolic acid; metallic soaps prepared from the fatty acid and either an alkali metal (Li, Na, K, etc.) or an alkaline earth metal (Mg, Ca, Ba, etc.); lecithin; etc. In addition to these, a higher alcohol having 12 or more carbon atoms and an ester thereof with sulfuric acid can be used. These dispersing agents are added in an amount of from 1 to 20 parts by weight per 100 parts by weight of the binder.

Examples of the lubricant are silicone oil, graphite, molybdenum disulfide, tungsten disulfide, an ester of a monobasic fatty acid having 12 to 16 carbon atoms with a monohydric alcohol having 3 to 12 carbon atoms, or an ester of a monobasic fatty acid having 17 or more carbon atoms with a monohydric alcohol, the total number of carbon atoms contained in the fatty acid and alcohol being 21 to 23. These lubricants are added in an amount of from 0.2 to 20 parts by weight per 100 parts by weight of the binder.

These lubricants are described in, for example, JP-B-43-23889, JP-A-42-28647 and 43-81543, U.S. Pat. No. 3,423,233 and JP-B-47-28043.

To the above raw materials for a magnetic coating composition is further added an organic solvent such as a ketone-type solvent such as acetone, methyl ethyl ketone, methyl isobutyl ketone or cyclohexanone; an alcohol-type solvent such as methanol, ethanol, propanol or butanol; an ester-type solvent such as methyl acetate, ethyl acetate, butyl acetate, ethyl lactate or glycol acetate monoethyl ether; an ether; a glycol ether-type solvent such as glycol dimethyl ether, glycol monoethyl ether or dioxane; a tar-type solvent (aromatic hydrocarbon) such as benzene, toluene or xylene; or a chlorinated hydrocarbon such as methylene chloride, ethylene chloride, carbon tetrachloride, chloroform, ethylene chlorohydrin or dichlorobenzene.

The ingredients are dispersed by means of a dispersing machine such as a three-roll mill, a sand mill, an attritor, a high-speed impeller dispersing machine or Kady mill, or by an ultrasonic method, thereby to prepare a magnetic coating composition. The magnetic coating composition thus prepared is filtered through a filter medium having a certain pore diameter and then temporarily stored in a tank. It is preferred that the magnetic coating composition in the tank is always stirred in order to prevent the agglomeration of the ferromagnetic powder.

Next, a hardenable component and/or a hardening reaction catalyst can be used as a hardening agent in this invention and are described below.

The hardenable component and hardening reaction catalyst both act on the binder in the magnetic coating composition and serve to harden the binder.

Of thermosetting resins or reactive resins, preferably used as the above-described hardenable ingredient, are compounds and resins having an isocyanate group in the molecule, such as hardenable polyurethane resins, isocyanate prepolymers, etc. Specific examples thereof include a polyester resin having an isocyanate group at both ends of the molecule, a polyether resin having an isocyanate group at both ends of the molecule, an adduct of 3 mol of tolylene diisocyanate with 1 mol of trimethylolpropane, an adduct of 3 mol of xylylene diisocyanate with 1 mol of trimethylolpropane, a biuret-type adduct of 3 mol of hexamethylene diisocyanate, an isocyanurate-type adduct of 5 mol of tolylene diisocyanate, etc.

Further, Examples of the hardening reaction catalyst are amines, organometallic compounds, alkali metal compounds, radical generators, etc., and particularly preferred of these are amines and organometallic compounds, which are used alone or in combination. Examples of the amines include triethylamine, N,N,N',N'-tetramethyl-1,3-butanediamine, dimethylethylmethanolamine, N,N-dimethylcyclohexylamine, N-methylmorpholine, N,N'-diethyl-2-methylpiperazine, etc. Examples of the organometallic compounds include dibutyltin dilaurate, dibutyltin di(2-ethylhexoate), zinc octenoate, zinc naphthenate, cobalt 2-ethylhexoate, etc. Examples of the alkali metal compounds include sodium oleate, potassium oleate, sodium orthophenylphenate, etc. Further, examples of the radical generators include benzoyl peroxide, lauroyl peroxide, azobisisobutyronitrile, etc.

The hardening agent and lubricant are diluted, individually or in the form of a mixture thereof, with an organic solvent not containing active hydrogen so as to have an any desired viscosity, and then temporarily stored in a tank different from the tank for the above-described magnetic coating composition.

The magnetic coating composition, the hardening agent and the lubricant, stored in the respective tanks, are fed at respective constant rates, whereby the hardening agent and lubricant are continuously added to the magnetic coating composition, and the resulting mixture is applied on a flexible support while uniformly and continuously mixing the mixture by means of a device such as an ultrasonic high-speed impeller.

In the above procedure, it is important that the magnetic coating composition should be applied on the support within its pot life after the hardening agent and lubricant are continuously added and mixed therewith, and preferably, the resulting mixture should be applied within 30 minutes.

In the case where the magnetic recording medium obtained according to this invention is used as a tape, the thickness of the support is from about 2.5 to 100 $\mu$m, preferably from about 3 to 40 $\mu$m. Examples of materials for the support are polyesters such as polyethylene terephthalate, and polyethylene naphthalate, polyolefins such as polypropylene, cellulose derivatives such as cellulose triacetate and cellulose diacetate, vinyl resins such as polyvinyl chloride, other plastics such as polycarbonates, metals such as aluminum and copper, and ceramics such as glass.

Methods for coating on the support the magnetic coating composition to which the above-described hardening agent and lubricant are continuously added are air doctor coating, blade coating, air knife coating, squeeze coating, impregnation coating, reverse roll coating, transfer roll coating, gravure-coating, kiss coating, cast coating, spray coating, etc., and other methods can also be employed. These methods are explained in detail in, for example, "Coating Kogaku (Coating Engineering)" pp. 253–277, published by Asakura Shoten in Mar. 20, 1971.

This invention will now be described in more detail by reference to the accompanying drawing.

A magnetic coating composition which has been dispersed by means of a dispersing machine 1 is filtered, passed through a line 2 into a storage tank 3, and stirred by means of a stirrer 4 in order to prevent a ferromagnetic powder from agglomeration. On the other hand, a hardening agent and a lubricant are stored in a storage tank 5 and, if desired and necessary, stirred by means of a stirrer 6. The magnetic coating composition, and a mixture of the hardening agent and lubricant are fed by means of constant-rate pumps 7 and 8, respectively, and their flow rates are measured by means of flowmeters 9 and 10. These two components are sent through lines 11 and 12, mixed by a mixer 13, if necessary and desired, and temporarily stored in a buffer tank 14. These two components are mixed uniformly in the buffer tank 14 by means of a stirrer 15, continuously fed to a coater 19 through a constant-rate pump 16, a dispersing machine 17 which is provided, if desired and necessary, and a filter 18, and then applied on a flexible support 20. The buffer tank 14 and coater 19 are equipped with flowmeters 21 and 22, respectively. The amounts of the two ingredients fed are regulated by means of a computer 23, while the flowmeters 21 and 22 are interlocked with the constant-rate pumps 7, 8 and 16 to control the flowability of the magnetic coating composition.

The calendering treatment in this invention means a treatment in which two or more metal rolls or rolls prepared by combining a metal roll with resilient rolls made of plastic or the like are pressurized and heated, and a magnetic recording medium is passed between the rolls, thereby to improve the surface properties (glossiness, surface roughness, etc.) of the magnetic layer. The calendering treatment in the present invention is preferably conducted when the magnetic coating composition which has been applied on a support is partially pre-dried to the extent that the amount of an organic solvent remaining in the magnetic coating solution becomes from 0.3 to 3 wt % based on the weight of the coating solution. It is particularly preferred that the treatment is conducted after drying is conducted until the amount of the residual solvent becomes from 0.5 to 2.5 wt %. If the amount of the residual solvent is below 0.3 wt %, the coating film becomes so hard that the effect of the calendering treatment is insufficient and a magnetic recording medium having good surface properties cannot be obtained. On the other hand, an amount larger than 3 wt % is not preferred because there is a fear to cause adhesion of the coating film to the calender rolls. Especially, when thickness of the coating film is not uniform, adhesion tends to occur.

The temperature and time for the drying before the calendering treatment vary depending upon the kind of solvent, the amount of the solvent in the coating solution and the amount of the residual solvent. Generally, however, the temperature is from 40° C. to 100° C. and the time is from about 2 to 5 seconds.

The conditions for the treatment with a calender are determined according to the kind of tape, the residual solvent amount and the construction material of the calender rolls. The temperature of the calender rolls is preferably from 50° C. to 150° C. If the temperature is below 50° C., it is difficult to improve the surface properties of the magnetic layer in a high-speed treatment, while a temperature exceeding 150° C. is not desirable because the support suffers deformation, shrinkage, elongation, etc. The linear pressure of the calender rolls is from 80 to 500 Kg/cm, preferably from 100 to 300 Kg/cm. If the pressure is less than 80 Kg/cm, it is difficult to improve the surface properties of the magnetic layer. On the other hand, a pressure exceeding 500 Kg/cm is not preferred in that the strength of the calendering machine is insufficient and the support tends to cause deformation.

After the calendering treatment, drying is conducted. It is preferred that the drying is generally conducted at 80° to 120° C. until the amount of the solvent remaining in the coated film becomes 0.1 wt % or less.

As described above, a magnetic coating composition is obtained by uniformly dispersing a powder such as a ferromagnetic powder into a solvent together with a polymer such as a binder. The solids in this magnetic coating composition have the binder, etc., adsorbed thereon so as to be suitable for dispersion and, due to the absence of a hardening agent or a lubricant, the solids are well maintained in the required dispersed state under a proper shearing condition.

However, upon the addition of a hardening agent and a lubricant by means of the mixer 13 at the final stage of the preparation (just before the coating) of a magnetic coating composition, the adsorption equilibrium which has been reached is broken in an extremely short period of time and new equilibrium is established. To take a particularly remarkable example, when a carboxylic acid having a —COOH group, such as oleic acid, butyl stearate, myristic acid or the like, is added as a lubricant, competitive adsorption takes place between the acid and the binder adsorbed on the magnetic material, and desorption of the binder which has been adsorbed on the magnetic material is observed.

As described above, in the present invention, drying as well as orientation is conducted and, subsequently, heating and pressurizing are also conducted by means of a calendering treatment, within 240 minutes during which the change in adsorption equilibrium resulting from the addition of a hardening agent and a lubricant has not yet been completed. This eliminates the variation of the dispersed state of a production lot of the magnetic coating composition with the lapse of time after kneading. Consequently, the squareness ratio and other properties are of course improved, extremely effective surface treatment of magnetic layers can be conducted, and the smoothness of the surfaces of the magnetic layers can be increased.

As described above, according to the process for producing a magnetic recording medium of this invention, by the specific procedures in which the addition of a hardening agent and a lubricant into a magnetic coating composition is not conducted until immediately before coating the composition, the adsorption equilibrium state of the magnetic coating composition can be well maintained for a long period of time and the flow behavior, etc., of the magnetic coating composition can be kept stable, whereby a magnetic coating composition of the same lot can be produced in a large quantity. Further, since calendering treatment is conducted within an extremely short and specific period of time after the addition of a hardening agent and a lubricant, not only the squareness ratio can be improved, but also the smoothness of the surface of the magnetic layer can be efficiently increased, so that it becomes possible to obtain a high-quality magnetic recording medium having high sensitivity and showing low noise.

This invention will be described in more detail by reference to the following Examples, but this invention should not be limited to these Examples.

EXAMPLE 1

Nickel-adsorbed Geothite was heat-treated at 600° to 750° C. to give an Fe-Ni type acicular oxide, which was then subjected to hydrogen reduction treatment at 300° to 400° C., thereby obtaining Fe-Ni type ferromagnetic metal powder.

The powder thus obtained was immersed in toluene and taken out into the air, and the toluene was vaporized while controlling the oxygen concentration, thereby obtaining Fe-Ni type ferromagnetic metal dry powder. The resulting ferromagnetic powder had the following properties; saturated magnetization ($\sigma$s): 140 emu/g, coercive force (Hc): 1,270 Oe, SsET specific surface area: 35 m$^2$/g. The proportion of Ni to Fe was 5.4 wt %.

Using the ferromagnetic metal powder, a magnetic coating composition was prepared from the following ingredients.

| | |
|---|---|
| Ferromagnetic metal powder | 100 parts by weight |
| Vinyl chloride/vinyl acetate vinyl alcohol copolymer (91/3/6 weight ratio) | 10 parts by weight |
| Polyester polyurethane (molecular weight: about 130,000) | 6 parts by weight |
| Carbon black (average particle diameter: 0.02 μm) | 1 part by weight |
| α-Al$_2$O$_3$ (average particle diameter: 0.4 μm) | 3 parts by weight |
| Methyl ethyl ketone | 150 parts by weight |
| Cyclohexanone | 150 parts by weight |

The above ingredients were introduced into a ball mill, kneaded for 10 hours, and then further dispersed for 2 hours by means of a sand grinder, thereby giving a magnetic coating composition.

Further, thereto were added 4 parts by weight of a polyisocyanate compound (trade name "Coronate L", manufactured by Nippon Polyurethane Industry Co., Ltd.), 1 part by weight of oleic acid and 1 part by weight of myristic acid, and these were dispersed for 30 minutes by high-speed shearing. Thereafter, the resulting mixture was applied on one side of a 15 μm thick polyethylene terephthalate base film (Ra: about 0.05 μm) at 300 m/min such that the dry thickness became 5 μm. Before the coating was dried, orientation was conducted, followed by drying for about 3 seconds. The resulting coating which had a residual solvent content of 2.5 wt % was subjected to a calendering treatment under the following conditions; linear pressure: 300 kg/cm, temperature: 80° C., speed: 300 m/min. Thereafter, drying was further conducted and the resulting product was slit into ½ inch width, thereby obtaining a video tape.

The calendering treatment was conducted 160 minutes after addition of a hardening agent (a polyisocyanate) and a lubricant (a fatty acid).

The formulation described above was practiced on the scale of 1 liter (ferromagnetic powder: 0.25 kg) and on the scale of 50 liter (ferromagnetic powder: 12 kg).

COMPARATIVE EXAMPLE 1

In Example 1 above, a magnetic solution on the scale of 1 liter was coated and then heat-dried while applying a magnetic field. The coated film was rolled up, allowed to stand at room temperature, and then subjected to a calendering treatment under the following conditions; linear pressure: 300 kg/cm, temperature: 80° C., speed: 300 m/min. The resulting product was slit into ½ inch width, thereby obtaining a video tape.

Results of Y·S/N and surface roughness obtained in Example 1 and Comparative Example 1 are shown in Table 1.

TABLE 1

| | Scale | Y · S/N | Surface roughness (Ra) |
|---|---|---|---|
| Example 1 | 1 liter | 0.6 dB | 5.79 nm |
| | 50 liter | 0.5 dB | 6.00 nm |
| Comparative Example 1 | 1 liter | −0.3 dB | 8.20 nm |

Y·S/N

S/N was measured on brilliance signals of 4 MHz, with the output level of a standard tape being regarded as 0 dB. Sample No. 5 in Example 2 was used as the standard tape.

Surface Roughness

The cut-off value was 0.25 mm in terms of center line average roughness (Ra) as defined in JIS B 0601.

In the above, Y·S/N values of 0 dB or more are the practicable level, while less than 0 dB are the impracticable level. Surface roughness values of 6.20 nm or less are the practicable level while more than 6.20 nm are the impracticable level.

EXAMPLE 2

| Composition (A) | |
|---|---|
| Ferromagnetic alloy powder | 100 parts by weight |
| (Fe—Ni alloy; Ni content: about 5 wt %; specific surface area [$S_{BET}$]: 55 m²/g) | |
| Vinyl chloride/vinyl acetate/maleic anhydride copolymer | 12 parts by weight |
| (400x110A, trade name, Nippon Zeon Co., Ltd.) | |
| Urethane resin | 12 parts by weight |
| (N-2301, manufactured by Nippon Polyurethane Industry Co., Ltd.) | |
| Carbon black | 2 parts by weight |
| (average particle diameter: 0.04 μm) | |
| α-Fe₂O₃ | 5 parts by weight |

| -continued | |
|---|---|
| Composition (A) | |
| (average particle diameter: 0.4 μm) | |
| Methyl ethyl ketone | 300 parts by weight |

The above composition (A) is introduced into a ball mill, dispersed for 24 hours, and then filtered through a filter having an average pore diameter of 3 μm, thereby obtaining a magnetic coating composition (hereinafter a magnetic coating composition not containing a hardenable and lubricating ingredient is referred to as "a magnetic coating composition O solution"), which is then temporarily stored in a tank (3 shown in the FIGURE). A hardenable and lubricating ingredient composition, (B), having the following composition was continuously added to this magnetic coating composition O liquid using the apparatus shown in the FIGURE.

| Composition (B) | |
|---|---|
| Polyisocyanate | 8 parts by weight |
| (Coronate L, manufactured by Nippon Polyurethane Industry Co., Ltd.) | |
| Oleic acid | 1 part by weight |
| Butyl stearate | 1 part by weight |
| Myristic acid | 1 part by weight |

The resulting mixture was coated on a polyethylene terephthalate web (hereinafter abbreviated as "PET") at a dry thickness of 5 μm, followed by orientation and drying, thereby obtaining a magnetic recording medium. The magnetic recording medium thus obtained was subjected to supercalender roll treatment, and slit into ½ inch width to obtain a video tape.

Conditions for the calender treatment were: speed: 300 m/min; linear pressure: 300 kg/cm; temperature: 80° C. Further, the time from the addition of the hardening agent and lubricant into the magnetic coating composition O liquid to the calendering treatment was varied to be 10 minutes, 60 minutes, 120 minutes, 160 minutes, 240 minutes and 300 minutes. Brilliance signals (Y·S/N) were measured on the video tapes obtained which were different in the time until the calendering treatment. Further, the surface properties of their magnetic layers were evaluated in terms of surface roughness.

The results obtained are shown in Table 2 below.

TABLE 2

| Sample No. | Time until calender treatment | Y · S/N | Surface roughness (Ra) |
|---|---|---|---|
| No. 1 | 10 min | +1.4 dB | 4.92 nm |
| No. 2 | 60 min | +1.1 dB | 5.21 nm |
| No. 3 | 120 min | +0.8 dB | 5.56 nm |
| No. 4 | 160 min | +0.4 dB | 5.72 nm |
| No. 5 | 240 min | ±0.0 dB | 5.80 nm |
| No. 6* | 300 min | −0.7 dB | 6.58 nm |

*comparison

EXAMPLE 3

Of the ingredients for the magnetic coating composition in Example 2 above, the methyl ethyl ketone was replaced with butyl acetate, and the lubricant and hardening agent were added 160 minutes before calendering treatment. As a result, the Y·S/N was 0.4 dB and the surface roughness was 5.60.

EXAMPLE 4

In Example 2, oleic acid, stearic acid and myristic acid as lubricants were added to the magnetic coating composition 0 liquid before the polyisocyanate as a hardening agent was added, and tape performances based on the time of from the addition of the lubricant to calendering treatment were measured in the same manner as in Example 2. That is, the fatty acids were added 200 minutes before the calendering treatment and the hardening agent was added 100 minutes before the calender treatment.

As a result, the Y·S/N was 0.2 dB and the surface roughness was 5.75 nm.

As apparent from Examples 1 to 4 and Table 1, it has been found that if the time of from the addition of hardening agent and lubricant to a magnetic coating fluid (magnetic coating composition O liquid) to calendering treatment is within 240 minutes, magnetic recording media having excellent surface properties, video sensitivity, etc., can be stably supplied.

It is apparent from the results of Examples 3 and 4 that the replacement of a solvent causes no problem and the order of addition of a lubricant and a hardening agent offers no problem so long as they are added within 240 minutes before the calendering treatment. That is, even if the lubricant and hardening agent are added at different times, no particular problem occurs.

While the invention has been described in detail and with reference to specific embodiments thereof, it will be apprent to one skilled in the art that various changes and modifications can be made therein without departing from the spirit and scope thereof.

What is claimed is:

1. A process for producing a magnetic recording medium comprising the steps of:
   (i) kneading a ferromagnetic powder in a binder solution, wherein said powder is dispersed into said binder solution, so as to form a magnetic coating dispersion;
   (ii) adding a hardening agent and a fatty acid to said dispersion formed in step (i) so as to form a magnetic coating composition;
   (iii) coating the magnetic coating composition formed in step (ii) on a non-magnetic support; and
   (iv) carrying out a calendering treatment of the coated support formed in step (iii), wherein the calendering treatment is carried out at a linear pressure of 80 to 500 kg/cm with a calender roll temperature of 50° to 150° C. and the calendering treatment is completed within 240 minutes after addition of the hardening agent or the fatty acid to the dispersion, whichever is added first.

2. The process of claim 1, wherein after the calendering treatment, the magnetic recording medium is dried so that the coated film has a residual solvent content of 0.1 weight % or less.

3. The process of claim 1, wherein the binder is a thermoplastic resin, a thermosetting resin, a reactive resin or a mixture of at least two thereof.

4. The process of claim 1, wherein the hardening agent is a hardenable component or a hardening reaction catalyst.

5. The process of claim 1, wherein the hardenable component is a compound or resin having at least one isocyanate group in its molecule.

6. The process of claim 1, wherein the hardening reaction catalyst is an amine, an organometallic compound, an alkali metal compound or a radical generator.

7. The process of claim 1, wherein the hardening agent and the fatty acid are added together to the dispersion of ferromagnetic particles and binder.

8. The process of claim 1, wherein the hardening agent and the fatty acid are added sequentially to the dispersion of ferromagnetic particles and binder.

9. The process of claim 1, wherein prior to calendering the coated magnetic layer is dried to a residual solvent content of from 0.3 to 3 weight %.

* * * * *